USO05983297A

United States Patent [19]
Noble et al.

[11] Patent Number: 5,983,297
[45] Date of Patent: Nov. 9, 1999

[54] METHOD AND APPARATUS FOR UPGRADING A COMPUTER SYSTEM

[75] Inventors: James L. Noble, Portland; Frank P. Hart, Beaverton; Ravi Nagaraj, Hillsboro, all of Oreg.; Neil W. Songer, Santa Clara, Calif.

[73] Assignee: Intel Corporation, Santa Clara, Calif.

[21] Appl. No.: 08/777,410

[22] Filed: Dec. 30, 1996

[51] Int. Cl.⁶ .................................................. G06F 13/00
[52] U.S. Cl. ............................................................ 710/102
[58] Field of Search ................................. 395/280, 281, 395/282, 283, 284; 710/100, 101, 102, 103, 104

[56] References Cited

U.S. PATENT DOCUMENTS

| | | |
|---|---|---|
| 4,383,184 | 5/1983 | McFarland ................................. 307/66 |
| 5,210,858 | 5/1993 | Jensen et al. . |
| 5,297,272 | 3/1994 | Lu et al. . |
| 5,321,827 | 6/1994 | Lu et al. . |
| 5,396,602 | 3/1995 | Amini et al. ............................. 395/325 |
| 5,404,559 | 4/1995 | Bonella et al. . |
| 5,410,726 | 4/1995 | Baqai et al. . |
| 5,444,298 | 8/1995 | Schutz . |
| 5,455,927 | 10/1995 | Huang . |
| 5,473,766 | 12/1995 | Shaver . |
| 5,490,279 | 2/1996 | Golbert et al. . |
| 5,493,655 | 2/1996 | Shen et al. . |
| 5,513,329 | 4/1996 | Pecone . |
| 5,530,620 | 6/1996 | Sangveraphunsiri . |
| 5,551,012 | 8/1996 | Chuang et al. . |
| 5,559,966 | 9/1996 | Cho et al. . |
| 5,586,270 | 12/1996 | Rotier et al. . |
| 5,604,871 | 2/1997 | Pecone . |
| 5,617,546 | 4/1997 | Shih et al. . |
| 5,625,802 | 4/1997 | Cho et al. . |
| 5,627,413 | 5/1997 | Mughir et al. . |
| 5,640,536 | 6/1997 | King et al. . |
| 5,644,760 | 7/1997 | Polzin et al. . |
| 5,664,118 | 9/1997 | Nishigaki et al. ....................... 395/283 |
| 5,664,197 | 9/1997 | Kardach et al. ......................... 395/728 |
| 5,748,912 | 5/1998 | Lee .......................................... 395/282 |
| 5,838,929 | 11/1998 | Tanikawa ................................ 710/102 |

*Primary Examiner*—Ayaz R. Sheikh
*Assistant Examiner*—Xuan M. Thai
*Attorney, Agent, or Firm*—David J. Kaplan

[57] ABSTRACT

A method and apparatus for upgrading a computer system from one processor generation to another processor generation. The processor and its corresponding primary bridge are included together on the same circuit board. The circuit board has an interface which can be inserted into a socket of a system. The interface socket includes the memory bus and peripheral component bus from the bridge.

14 Claims, 4 Drawing Sheets

METHOD AND APPARATUS FOR UPGRADING A COMPUTER SYSTEM

FIELD OF THE INVENTION

The present invention relates to computer systems and more particularly to a method and apparatus for upgrading a computer system from one processor generation to another processor generation.

BACKGROUND OF THE INVENTION

At the current pace of technological innovation, an electronic device purchased today will likely become obsolete within the next couple of years. This presents a frustrating dilemma to consumers. Rapid obsolescence is perhaps nowhere more apparent than in the personal computer market segment. With new generations of more powerful computers being released every six months to a year, a consumer is wary of paying a premium for a top-of-the-line computer system knowing that in less than a year's time, the same computer will be considered old technology, available to consumers at less than half its retail price at introduction.

One way a consumer can protect their investment in a computer system is to purchase a system having a processor that can be upgraded. For example, a consumer could purchase a 486-based computer system operating at 66 MHz, and later, if more power is desired, upgrade their processor to, for example, a 100 MHz 486 processor. For desktop personal computer systems, a consumer may also be able to upgrade their 486 processor-based system to a more powerful, compatible, next generation processor such as a Pentium® processor, available from Intel Corporation of Santa Clara, Calif. In this manner, some portion of a consumer's initial investment in their desktop computer system is salvaged because the consumer need only purchase a more powerful processor to upgrade their computer system rather than purchasing an entirely new computer system.

Unfortunately, mobile computer systems are not as easily upgradable. Mobile computer systems include, for example, notebook computers, laptop computers, and personal data assistants. In the interest of saving space, the processor, chipset, memory, and various other primary components of the mobile computer system are highly integrated. This high degree of integration makes upgrading any one component of the mobile computer system, such as the processor, technically challenging and expensive, particularly for an upgrade from one processor generation to the next.

For example, FIG. 1 is a prior art computer system in which processor 100 is coupled to and communicates with the primary bridge, bridge A 103, and level-2 cache 130, via host bus 108. Bridge 103 couples processor 100 to peripheral component interconnect (PCI) bus agents 1 and 2 by coupling host bus 108 to PCI bus 106, to which the bus agents are coupled. The PCI protocol is described by the *PCI Local Bus Specification,* Revision 2.0 (1993), and Revision 2.1 (1995). In addition, bridge 103 couples processor 100 and PCI bus agents 1 and 2 to memory 104 by coupling host bus 108 and PCI bus 106 to memory bus 109, to which memory 104 is coupled. In this manner, bridge 103 enables three-way communication between memory 104, processor 100, and PCI agents 1 and 2. Clock 102 is coupled to and provides clock signals to processor 100, primary bridge 103, level-2 cache 130, and PCI agents 1 and 2. A secondary bridge, bridge B 105, is coupled to PCI bus 106 and to secondary bus 107, enabling communication between secondary bus agents 3 and 4, coupled to secondary bus 107, and the rest of the computer system. Secondary bus bridge 105 is also coupled to processor 100 by way of signal line 110. Also, voltage regulator 101 is coupled to and provides a voltage supply to processor 100.

Upgrading processor 100 to a faster processor in the same processor family is simply a matter of removing the old processor and inserting a new processor into the same socket. Upgrading to a next generation processor family, however, is more involved. To effectively upgrade the computer system of FIG. 1 to a next generation processor, many components, in addition to processor 100, may need to be replaced. Replacement of these components in a mobile system may cost more than the system itself is worth. In addition, the interconnect routings between these components and their corresponding sockets will not likely support an upgrade.

SUMMARY OF THE INVENTION

A method and apparatus is described for upgrading a computer system from one processor generation to another processor generation. The processor and its corresponding primary bridge are included together on the same circuit board. The circuit board has an interface which can be inserted into a socket of a system. The interface socket includes the memory bus and peripheral component bus from the bridge.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for upgrading a computer system from one processor generation to another processor generation. A circuit board of a processor module includes an interface for coupling the circuit board to a peripheral subsystem via a socket. For one embodiment of the present invention, the circuit board also includes a processor, a voltage regulator, a primary bridge, a temperature sensor, a level-2 cache, a frequency select circuit, and a clock. The processor module is coupled to a mobile system by plugging the circuit board into a socket of the system, mating the interface to the socket. The peripheral subsystem includes a voltage conversion circuit that converts signals from a first voltage to a second voltage, the second voltage being determined by a reference signal applied to the voltage conversion circuit. The peripheral subsystem also includes a secondary bridge, main memory storage components, and, in accordance with one embodiment of the present invention, a clock.

In this manner, the different voltage levels, clocking schemes, and device pinouts and interconnects associated with different processor generations are isolated to the modules themselves. The socket interface between the different processor modules, however, remains the same. Therefore, upgrading the mobile computer system from one processor to a next generation processor is simply a matter of exchanging one processor module for another. A more detailed description of the present invention, including various configurations and implementations in accordance with alternate embodiments of the present invention, is provided below.

Figure 1:
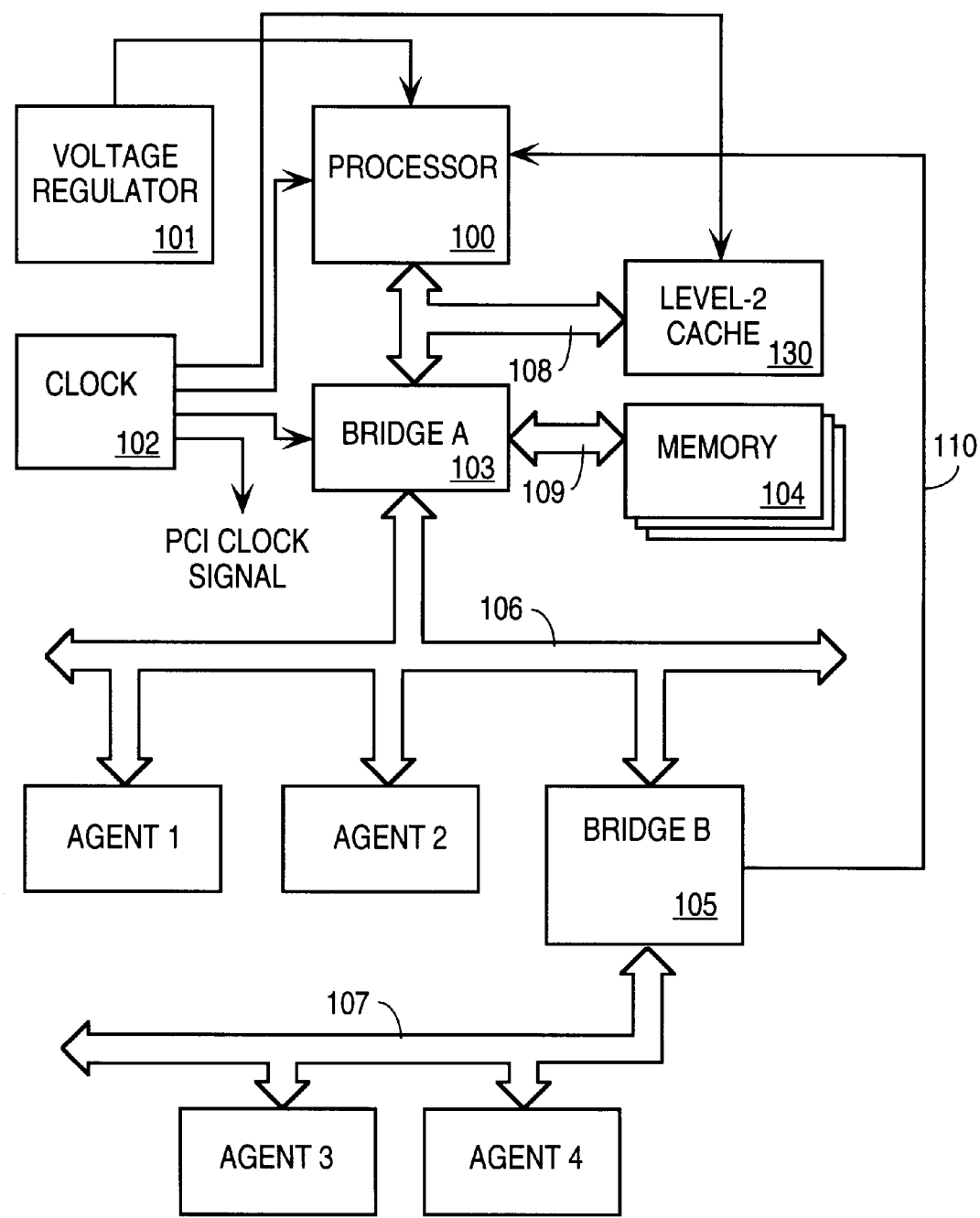
FIG. 1 is a prior art computer system.
Figure 2:
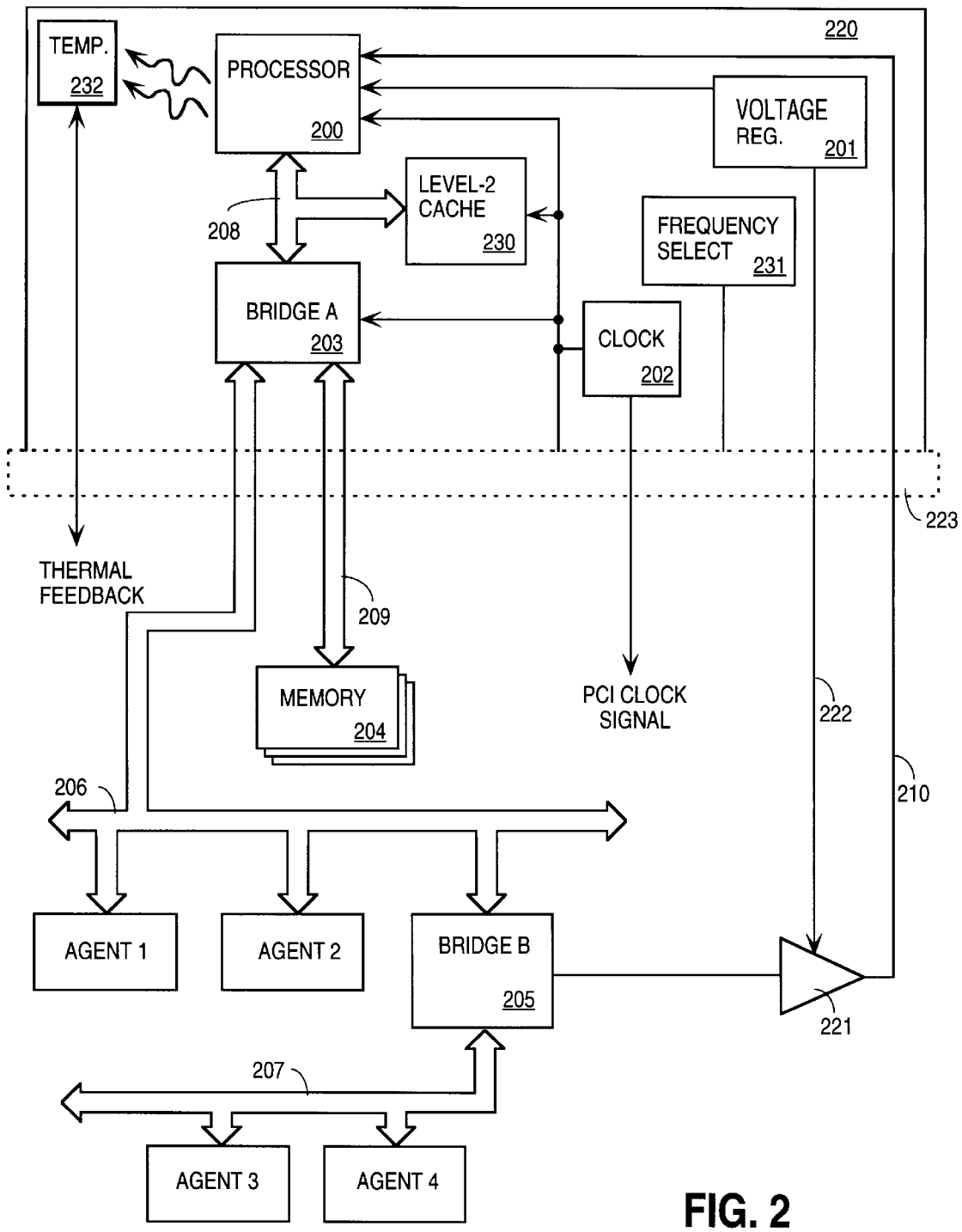
FIG. 2 is a computer system formed in accordance with one embodiment of the present invention.

FIG. 2 is a computer system formed in accordance with one embodiment of the present invention in which an electronic component referred to as a processor module 220 includes a circuit board containing processor 200, voltage regulator 201, primary bridge 203, clock 202, temperature sensor 232, level-2 cache 230, frequency select circuitry 231 and associated signal lines and interfaces. Processor module 220 includes an interface that is inserted into system socket 223, thereby coupling the signal lines of the circuit board of processor module 220 to corresponding signal lines of a peripheral subsystem comprising one or more separate circuit boards that contain system memory 204, bus agents 1–4, secondary bridge B 205, and voltage conversion circuit 221.

Processor 200 is coupled to primary bridge 203 and level-2 cache 230 by way of host bus 208. Voltage regulator 201 is coupled to and provides a voltage supply to processor 200, and clock 202 is coupled to and provides a clock signal to processor 200, level-2 cache 230, and bridge 203. Primary bridge 203 is also coupled to two other buses, peripheral component interconnect (PCI) bus 206 and memory bus 209. The signal lines that make up PCI bus 206 couple primary bridge 203, through system socket interface 223, to PCI bus agents 1 and 2 as well as to secondary bridge 205. Memory bus 209 couples bridge 203, through system socket interface 223, to system main memory 204. Clock 202 includes a clock signal output that provides a PCI clock signal to PCI bus agents along the PCI clock signal line that extends from clock 202, across the system socket interface 223, to the peripheral subsystem side comprising the circuit boards containing PCI bus agents 1 and 2. Temperature sensor 232 provides thermal information regarding the temperature of processor 200 across the system socket interface 223 to the peripheral subsystem. Although frequency select circuit 231 provides clock frequency information along an interconnect line that is coupled to socket 223, in accordance with the embodiment of FIG. 2, this interconnect line is left uncoupled to any corresponding interconnect line or circuit in the peripheral subsystem.

Secondary bus bridge 205 is coupled to bus agents 3 and 4 by way of secondary bus 207. Bridge 205 is also coupled to processor 200, through interface 223, by subsystem signal line 210. A voltage conversion circuit 221 is placed on subsystem signal line 210, between secondary bridge 205 and processor 200, on the peripheral subsystem side of the subsystem signal line. The peripheral subsystem side of the computer system of FIG. 2 is the portion of the computer system external to the processor module (the portion of FIG. 2 that is below socket interface 223). In addition, voltage regulator 201 is coupled to voltage conversion circuit 221 by voltage reference signal line 222, bridging the processor module circuit board to the circuit board containing voltage conversion circuit 221 by way of system socket interface 223.

For one embodiment of the present invention, the system of FIG. 2 is implemented in a mobile computer system. For another embodiment, the system is implemented in another type of computer system such as, e.g., a desktop computer system or a server.

Processor 200, along with the other components included on processor module 220, communicates with the rest of the computer system, on the peripheral subsystem side, through a socket 223 that couples an interface of exposed electrical contact regions located at an edge of the circuit board of processor module 220 to a second circuit board. By placing processor 200 on a peripheral circuit board in this manner, rather than directly on the motherboard, the need for pin compatibility between processor generations is reduced. This is because specified signal lines of the peripheral subsystem are coupled to corresponding signal lines on the processor module via the interface, and these signal lines are then routed in the desired manner on the processor module to the appropriate I-O pins of the processor. This way, not only can different processor speeds and generations having different I-O pin definitions be made compatible with a single socket interface but also different processor packaging technologies can be explored on different processor modules, while socket interface compatibility is maintained. Therefore, in accordance with an embodiment of the present invention, a user can upgrade or modify a computer system by simply swapping one processor module for another, without concern for matching the pinout or packaging technologies from one processor to another.

The voltage level of a signal is the magnitude of the nominal high voltage (the specified "on" state) minus the nominal low voltage (the specified "off" state). This is the difference in voltages corresponding to a logical "1" and a logical "0". For an embodiment in which the low voltage value is 0V (ground), the voltage level is equal to the defined nominal high voltage.

Voltage regulator 201 provides processor 200 with a voltage supply. For one embodiment of the present invention, the voltage supply provided by voltage regulator 201 is at the I-O voltage level (the voltage level at which the processor's I-O pins are are specified for). In accordance with a mobile environment, this voltage is typically 3.3V or 2.5V, but this value continues to decrease with each new processor generation. For embodiments of the present invention in which the processor requires voltage supplies of two or more different voltages, such as, for example, when the processor's core operates at a lower voltage than its I-O voltage level, the voltage regulator on the processor module may provide these additional voltage supplies as well. By including voltage regulator 201 on processor module 220, one can ensure that the voltage regulator output voltage always properly matches the requirements of the processor and other components of the processor module, and is coupled to the proper pins. This allows a computer system to be upgraded or modified by simply swapping one processor module for another, without concern for processor I-O voltage levels or attempting to match the voltage levels and signal lines of the computer system to the processors and components being upgraded.

Primary bridge 203 translates signals between the signal lines that make up host bus 208, PCI bus 206, and memory bus 209. This allows three-way communication between processor 200, memory 204, and any components coupled to PCI bus 206, including agents 1 and 2 and secondary bridge 205. For one embodiment of the present invention, the interface between bridge 203 and processor 200 along the host bus (also known as a system bus, processor bus, or local bus) is unique to each processor/bridge pair. Conversely, PCI bus 206 and memory bus 209 operate on well specified protocols that are consistent across processor and bridge generations. By including primary bridge 203 together with its matching processor 200 on processor module 220, one can ensure that the bridge always properly communicates with the processor across the host bus. This allows a computer system to be upgraded or modified by simply swapping one processor module for another, without concern for attempting to match the processor to a corresponding bridge, while keeping PCI and memory bus protocols consistent. For an alternate embodiment of the present invention, the PCI bus is any other type of peripheral component bus.

Clock 202 provides processor 200, level-2 cache 230, and primary bridge 203 with a clock signal. In addition, clock 202 provides a PCI clock signal across socket interface 223 to PCI agents 1 and 2, and to secondary bridge 205. For one embodiment of the present invention, the clock signal provided to processor 200, level-2 cache 230, and bridge 203 is 60 or 66 MHz. The clock signal provided to components coupled to PCI bus 206, including bridges 203 and 205, and agents 1 and 2, is 30 or 33 MHz. For an embodiment of the present invention in which the clock signal is provided to an input pin of processor 200, the voltage level of the clock signal provided to the processor matches the I-O voltage level that processor 200 is designed for. For one embodiment, the PCI clock signal voltage level is different from the voltage level of the signal provided to the processor, and is approximately 3.3V in a mobile computer system. For an embodiment of the present invention implemented in a more advanced computer system, the clock signal is faster. By including clock 202 together with bridge 203, level-2 cache 230, and processor 200 on processor module 220, one can ensure that the included clock is properly designed to support the associated processor, cache, and bridge. This allows a computer system to be upgraded or modified by a user by simply swapping one processor module for another, without concern for determining and accounting for the proper clock speed and voltage levels.

Temperature sensor 232 provides information to the system regarding the temperature of processor 200. By monitoring the temperature measured by temperature sensor 232, the system can determine if processor 200 becomes too hot. If processor 200 overheats, the system executes instructions reserved for this occurrence. For example, the system may shut down, go into low power mode, lower the clock frequency, lower the voltage supply levels, or notify the user and request instructions. By including temperature sensor 232 together with processor 200 on processor module 220, one can ensure that the temperature sensor is properly designed and located to provide accurate thermal feedback on the associated processor. This allows a computer system to be upgraded or modified by a user by simply swapping one processor module for another, without concern for repositioning or replacing the processor temperature sensor to account for, for example, changes in processor dimensions or package design.

Level-2 cache 230 stores data and instructions used by processor 200. For one embodiment of the present invention, the interface between level-2 cache 230 and processor 200 along the host bus is unique to each processor/level-2 cache pair. By including level-2 cache 230 together with its matching processor 200 on processor module 220, one can ensure that the level-2 cache always properly communicates with the processor. This allows a computer system to be upgraded or modified by simply swapping one processor module for another, without concern for attempting to match the processor to a corresponding level-2 cache. For an alternate embodiment of the present invention, the level-2 cache is coupled to the processor by a bus other than the host bus, such as, for example, a back-side bus.

Memory 204 comprises several dynamic random access memory (DRAM) semiconductor components which do not require a clock signal. An embodiment in which synchronous DRAM (SDRAM) memory components are implemented, requiring the application of a clock signal to achieve synchronization, is described below in conjunction with FIG. 3.

PCI bus agents 1 and 2 coupled to PCI bus 206 are peripheral devices compliant with the PCI bus protocol, and communicate with other components of the computer system including, for example, processor module 220. For one embodiment of the present invention, PCI bus agents 1 and 2 include a graphics card, video capture device, or other device that requires close proximity to the processor. For another embodiment of the present invention, PCI bus agents are PCcard or Cardbus sockets into which a user inserts compatible peripheral devices.

Secondary bridge 205 translates signals between the signal lines that make up PCI bus 206 and secondary bus 207. This allows devices above secondary bridge 205, including PCI bus agents 1 and 2, memory 204, and processor 200, to communicate with devices coupled to secondary bus 207, including secondary bus agents 3 and 4. For one embodiment of the present invention, secondary bus 207 is another PCI bus. For an alternate embodiment of the present invention, the secondary bus conforms to an alternate type of bus architecture including, for example, IDE, ISA, or universal serial bus (USB). In addition to bridging PCI bus 206 to secondary bus 207, secondary bridge 205 sends subsystem signals directly to processor 200, along subsystem signal line 210. Subsystem signals are signals that are provided from the peripheral subsystem to the processor module, other than those signals provided along the PCI or memory buses. For one embodiment of the present invention, these signals include, for example, clock signals, processor reset, co-processor error, initialization, processor interrupt, reset processor input, sleep, system management interrupt, and stop clock. In accordance with an embodiment of the present invention, these subsystem signals are provided to and are used by other system resources as well.

Voltage conversion circuit 221 receives subsystem signals provided by secondary bridge 205 along subsystem signal line 210, and converts the voltage level of these subsystem signals to a voltage level indicated by the voltage reference signal provided by reference signal line 222. This is done to maintain the proper timing between the peripheral subsystem and the processor. Signal timing is a function of voltage levels. The voltage levels of the subsystem signals provided by bridge 205 are converted to processor I-O voltage levels before the subsystem signals reach processor module 220 along signal line 210. By using voltage conversion circuit 221 to convert the subsystem signals on the peripheral subsystem side, rather than waiting until those signals reach the processor module, proper timing between the subsystem signals, components coupled to signal line 210 on the peripheral subsystem side, and processor 200 is achieved. This is particularly important for embodiments in which tight skew tolerances between clocked signals must be achieved. For one embodiment of the present invention, the voltage conversion circuit is a buffer, and the voltage reference signal is a voltage supply to the buffer.

By providing the voltage reference signal from the processor module indicating the proper target voltage level to a voltage conversion circuit on the peripheral subsystem side, one can ensure that the subsystem signals provided to the processor, or other components of the processor module, are properly synchronized and at the proper voltage levels. This allows a computer system to be upgraded or modified by a user by simply swapping one processor module for another, without concern for changes in processor I-O voltage levels and signal timings.

Figure 3:
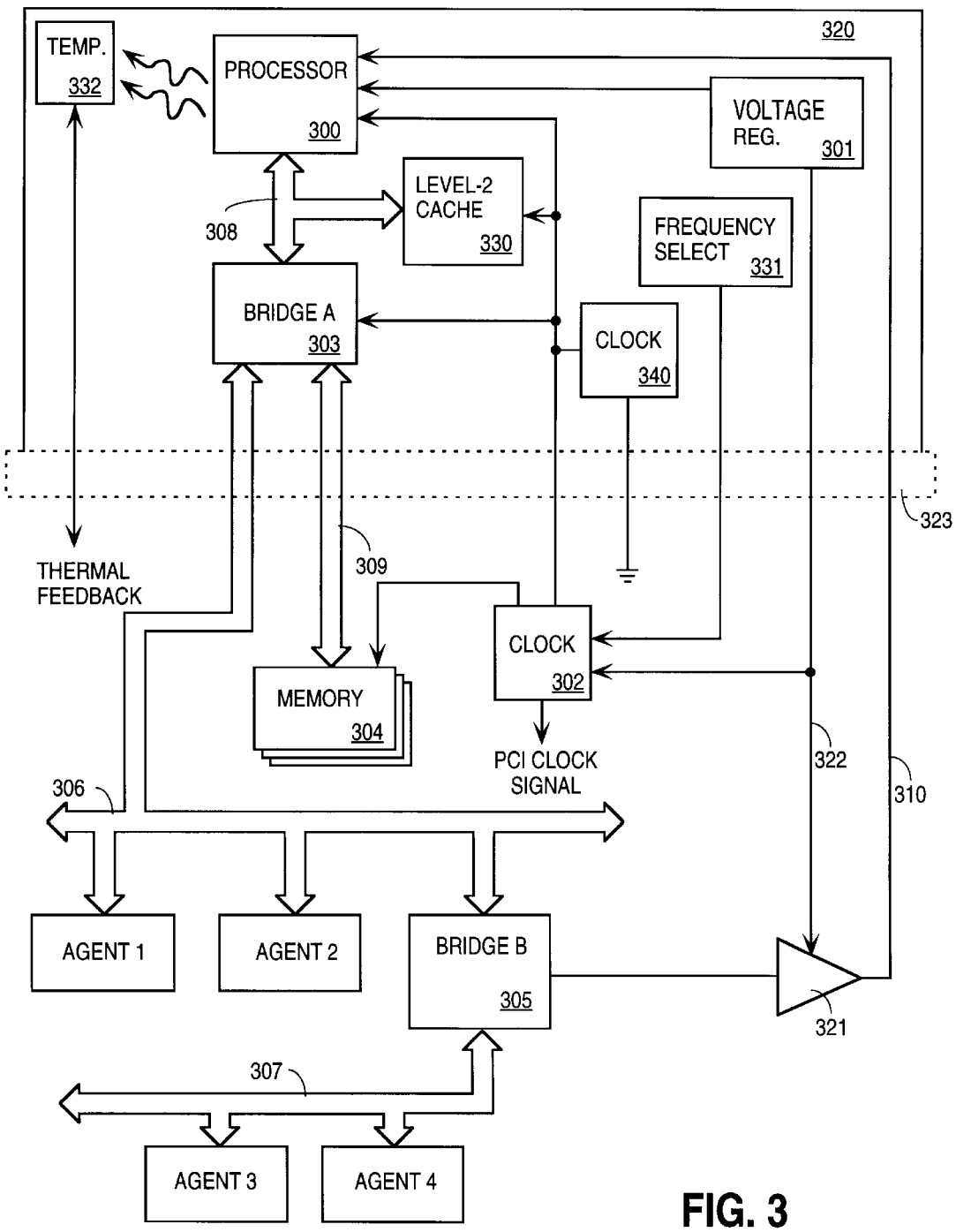
FIG. 3 is a computer system formed in accordance with another embodiment of the present invention.

FIG. 3 is a computer system formed in accordance with another embodiment of the present invention in which a processor module 320 includes a circuit board containing processor 300, voltage regulator 301, bridge A 303, temperature sensor 332, level-2 cache 330, clock 340, frequency select circuit 331, and the associated signal lines and interfaces. Processor module 320 includes an interface that is inserted into system socket 323, thereby coupling the signal lines of the circuit board of processor module 320 to corresponding signal lines of a peripheral subsystem comprising one or more separate circuit boards that contain system memory 304, bus agents 1-4, secondary bridge B 305, clock 302, and voltage conversion circuit 321.

Processor 300 is coupled to primary bridge 303 and level-2 cache 330 by way of host bus 308. Voltage regulator 301 is coupled to and provides a voltage supply to processor 300. Primary bridge 303 is also coupled to two other buses, PCI bus 306 and memory bus 309. The signal lines that make up PCI bus 306 couple primary bridge 303, through system socket interface 323, to PCI bus agents 1 and 2 as well as to secondary bridge 305. Memory bus 309 couples bridge 303, through system socket interface 323, to system main memory 304. Clock 302 includes a clock signal output that provides a PCI clock signal to the PCI bus and another clock signal output that is coupled to and provides a clock signal to system main memory 304. Clock 302 also provides clock signals across a clock signal line that extends from clock 302, across system socket interface 323, to processor 300, level-2 cache 330, and bridge 303 of processor module 320. Temperature sensor 332 provides thermal information regarding the temperature of processor 300 across system socket interface 323 to the peripheral subsystem. Frequency select circuit 331 provides clock frequency information across system socket interface 323 to clock 302 in the peripheral subsystem. Clock 340 is coupled to a clock reference signal line across system socket interface 323, and this reference signal line is coupled to ground on the peripheral subsystem side.

Secondary bus bridge 305 is coupled to bus agents 3 and 4 by way of secondary bus 307. Bridge 305 is also coupled to processor 300, through interface 323, by subsystem signal line 310. A voltage conversion circuit 321 is placed on subsystem signal line 310, between secondary bridge 305 and processor 300, on the peripheral subsystem side of the subsystem signal line. In addition, voltage regulator 301 is coupled to voltage conversion circuit 321 and to clock 302 by voltage reference signal line 322, bridging the processor module circuit board to the circuit board containing voltage conversion circuit 321 and the circuit board containing clock 302 by way of system socket interface 323.

For one embodiment of the present invention, the system of FIG. 3 is implemented in a mobile computer system. For another embodiment, the system is implemented in a desktop computer system or in a server.

The computer system of FIG. 3 operates in much the same way that the computer system of FIG. 2 operates, the primary difference being that clock 302 provides clock signals to processor 300, bridge 303, level-2 cache 330, and PCI components from the peripheral subsystem side (i.e. is a subsystem signal) rather than from processor module 320. In addition, for the embodiment shown in FIG. 3, memory 304 comprises SDRAM components, requiring that a clock signal be provided to memory 304 from clock 302, as shown.

As stated above, signal timing is a function of voltage levels. Therefore, to reduce the clock skew between processor 300 and memory 304, the voltage level of the clock signal provided to processor 300 is converted by voltage conversion circuitry within clock 302 according to the reference voltage provided along signal line 322. This ensures that the tight skew tolerances required by SDRAM components are met.

Clock frequency information is provided to clock 302 from frequency select circuit 331 to indicate to clock 302 what clock signal frequency to provide to the processor. For example, for one embodiment of the present invention, a signal from frequency select circuit 331 comprises a binary value indicating that clock 302 is to provide either a 60, or 66 MHz clock signal to processor 300. By grounding the reference line extending from clock 340 to the peripheral subsystem side, clock 340 is turned off by, for example, either disabling its supply voltage or otherwise preventing its output from reaching either processor 300, level-2 cache 330, or bridge 303.

Figure 4:
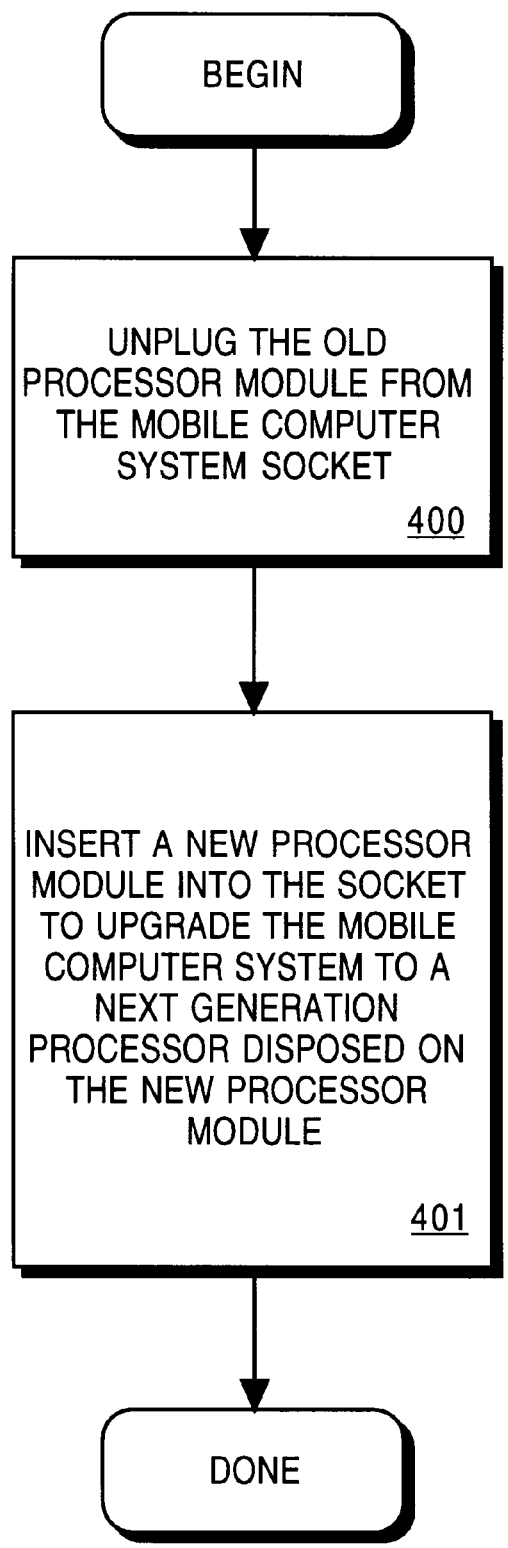
FIG. 4 is a flow chart showing a method of the present invention.

FIG. 4 is a flow chart showing one method of the present invention. At step 400 a processor module is unplugged from a mobile computer system socket. For one embodiment of the present invention, this processor module includes a processor and a bridge. For another embodiment of the present invention, the processor module additionally includes a clock. For other embodiments of the present invention, the processor module also includes, for example, a temperature sensor, a level-2 cache, a voltage regulator, or a frequency select circuit. The peripheral subsystem includes peripheral components, a secondary bridge, memory, a voltage conversion circuit, or a clock.

At step 401, a new processor module containing a next generation processor is inserted into the socket, thereby upgrading the computer system. For one embodiment of the present invention, this new processor module includes a processor and a bridge. For another embodiment of the present invention, the processor module additionally includes a clock. For other embodiments of the present invention, the processor module also includes, for example, a temperature sensor, a level-2 cache, a voltage regulator, or a frequency select circuit. Note that in accordance with one embodiment of the present invention, after the system is upgraded in this manner, the basic input-output system (BIOS) that resides on the peripheral subsystem side is also upgraded to accommodate the new components of the processor module.

This invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An upgrade processor module for a computer system comprising:
   a circuit board;
   an interface disposed on the circuit board to couple the circuit board to a peripheral subsystem via a socket;
   a processor disposed on the circuit board;
   a voltage regulator disposed on the circuit board, coupled to the processor and the interface, to provide a voltage supply to the processor and a voltage reference signal to the peripheral subsystem for use by the system to convert a signal from the peripheral subsystem from a first voltage level to a second voltage level; and a primary bridge disposed on the circuit board, coupled to the processor via a host bus and coupled to the interface via a memory bus and a peripheral component bus.

2. The module of claim 1, further comprising a first clock disposed on the circuit board, coupled to the processor, the primary bridge, and the interface to provide a clock signal to the processor and primary bridge in a first configuration, and to be turned off in a second configuration.

3. The module of claim 2, further comprising a frequency select circuit disposed on the circuit board and coupled to the interface to provide clock frequency information to a second clock disposed in the peripheral subsystem in the second configuration.

4. The module of claim 3, further comprising a voltage regulator disposed on the circuit board and coupled to the processor and the interface to provide a voltage supply to the processor and a voltage reference signal to the second clock in the second configuration.

5. The module of claim 1, further comprising a level-2 cache disposed on the circuit board and coupled to the processor.

6. The module of claim 1, further comprising a temperature sensor disposed on the circuit board and coupled to the interface to provide thermal information to the peripheral subsystem.

7. A computer system comprising a first circuit board;

a second circuit board coupled to the first circuit board;

a processor disposed on the first circuit board;

a primary bridge disposed on the first circuit board, coupled to the processor via a host bus and coupled to the second circuit board via a memory bus and a peripheral component bus;

a secondary bridge disposed on the second circuit board and coupled to the primary bridge via the peripheral component bus, and to the processor;

a voltage regulator disposed on the first circuit board, coupled to the processor, the voltage regulator to provide a voltage reference signal;

a voltage conversion circuit disposed on the second circuit board, coupled to the voltage regulator, to receive the voltage reference signal and to convert a signal from the secondary bridge from a first voltage level to a second voltage level; and a first clock disposed on the first circuit board, coupled to the processor, the primary bridge, and the second circuit board.

8. A computer system comprising:

a first circuit board;

a second circuit board coupled to the first circuit board;

a processor disposed on the first circuit board;

a primary bridge disposed on the first circuit board, coupled to the processor via a host bus and coupled to the second circuit board via a memory bus and a peripheral component bus;

a secondary bridge disposed on the second circuit board and coupled to the primary bridge via the peripheral component bus, and to the processor;

a voltage regulator disposed on the first circuit board, coupled to the processor, the voltage regulator to provide a voltage reference signal;

a voltage conversion circuit disposed on the second circuit board, coupled to the voltage regulator, to receive the voltage reference signal and to convert a signal from the secondary bridge from a first voltage level to a second voltage level; and a first clock disposed on the first circuit board, coupled to the processor, the primary bridge, and the second circuit board, to provide a clock signal to the processor and primary bridge in a first configuration, and is turned off in a second configuration by a signal to the first clock from the second circuit board.

9. The computer system of claim 8, further comprising a frequency select circuit disposed on the first circuit board, coupled to a second clock disposed on the second circuit board in the second configuration.

10. The computer system of claim 8, further comprising a voltage regulator disposed on the first circuit board, coupled to the processor and to a second clock disposed on the second circuit board in the second configuration to convert a clock signal from a first voltage level to a second voltage level before the signal is provided to the processor.

11. The computer system of claim 8, further comprising a level-2 cache disposed on the first circuit board, coupled to the processor.

12. The computer system of claim 8, further comprising a temperature sensor disposed on the first circuit board, coupled to the second circuit board, and configured to provide thermal information to the system.

13. The computer system of claim 8, further comprising main memory storage components disposed on the second circuit board.

14. The computer system of claim 8, wherein the first and second circuit boards are contained in a mobile computer system.

* * * * *